United States Patent Office 2,728,761
Patented Dec. 27, 1955

2,728,761

AZO DYE CONTAINING A SYM-TRIAZYL NUCLEUS

William E. Wallace, Rensselaer, N. Y., and Ludwig Richter, Easton, Pa., assignors to General Aniline & Film Corporation, New York, N. Y., a corporation of Delaware No Drawing. Application January 24, 1952, Serial No. 268,126

3 Claims. (Cl. 260—153)

This invention relates to dye intermediates containing a symmetrical triazyl nucleus which are useful in the preparation of direct azo dyes.

It is known that azo dyestuff intermediates containing a sym-triazyl nucleus can be prepared by condensing an aminonaphthol or substitution product thereof with cyanuric chloride, i. e., 2,4,6-trichloro-1,3,5-triazine. The resulting primary reaction product, which contains 2 reactive chlorines, can be treated with an amine, such as the sodium salt of p-aminobenzeneazo-salicylic acid to yield a secondary product containing only one reactive chlorine. The latter product is then condensed with an aromatic amine to yield an azo dye intermediate which is treated with a diazonium compound to yield an azo dye for wool, cotton, etc.

The process involved in the foregoing steps is fully described in United States Patents 1,625,530–1–2–3, and 1,667,531. In the initial condensation reaction between the cyanuric chloride and aminonaphthol or substitution product thereof, such as, for example, 1,8-aminonaphthol-3,6-disulfonic acid, and the like, the procedure leads to the formation of by-products presumably due to appreciable condensation of the —OH group of the aminonaphthol with active halogen atoms of the cyanuric chloride. These undesirable side reaction products result in lowered yields of the primary condensation product and are separated from the desired product with considerable difficulty. It is absolutely essential that the undesired side reaction products be removed, otherwise dull, off-shade dyes result from the utilization of the intermediates contaminated with the side reaction products.

It is an object of the present invention to provide 8-[2-chloro-4-substituted-symmetrical triazinyl-6-amino]-1-substituted sulfonyloxy-3,6-naphthalene disulfonic acids, wherein the substituent in the 1-position is either an alkyl, aryl, or aralkyl radical and the substituent in the 4-position is either chlorine or an organic amino radical, which are useful intermediates for the preparation of direct azo dyestuffs and which are free of impurities and require no purification.

Other objects and advantages will be apparent from the following specification in which the preferred details and embodiments are described.

We have discovered that a new class of dyestuff intermediates which contain no undesirable side reaction products and require no purification to yield intermediates capable of forming azo dyes of bright, pure shades are readily obtained by condensing an alkyl, aryl, or aralkyl ester of 1,8-aminonaphthol-3,6-disulfonic acid or a salt thereof with cyanuric chloride or with a monoamine substituted cyanuric chloride reaction product in which the substituent is preferably a residue of a primary amine. Such dyestuff intermediates are characterized by the following general formula:

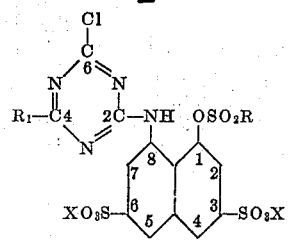

wherein R represents an alkyl, aryl, or aralkyl radical, e. g., methyl, ethyl, propyl, butyl, hexyl, decyl, dodecyl, etc., phenyl, naphthyl, diphenyl, benzyl, methylbenzyl, ethylbenzyl, propylbenzyl, and the like, $R_1$ represents either chlorine or a substituted primary amino radical, e. g., methylamino, ethanolamino, dodecylamino, anilino, toluino, cumidino, 2,4-dimethylanilino, p-methoxyanilino, p-phenetidino, benzidino, benzamido, phenylureido, naphthylamino, anthraquinonylamino, and the like, and X represents either hydrogen or an ion of the class of alkali metals, e. g., lithium, potassium, sodium, and the like, or ammonium, tetralkyl-ammonium, e. g., tetramethyl-, tetraethyl-, tetrapropyl-ammonium, and the like, dicyclohexyl-ammonium, diethanol-ammonium, triethanol-ammonium, cyclohexyl-ammonium, and the like.

The dyestuff intermediates or dyestuff coupling components characterized by the foregoing formula contain no impurities or side reaction products whatsoever and readily lend themselves, without any tedious or involved purification steps, to complete isolation as such or can be further condensed with an organic primary amine. The secondary condensation product (which is generally used to form the trisubstituted product by coupling prior to hydrolysis) can be isolated or subjected to hydrolysis whereby the substituted sulfonyloxy group is converted to a hydroxy group to yield the final dye intermediates which are particularly useful as coupling components in the synthesis of direct azo dyes.

In preparing the dyestuff intermediates of the present invention one molecular proportion of cyanuric chloride as such, or cyanuric chloride containing a substituted primary amino or azo-bridged primary amino radical, is dissolved in a lower alcohol, such as methyl, ethyl, or isopropyl alcohol, or in a ketone, such as acetone, ethyl methyl ketone, diethyl ketone, isopropyl methyl ketone, and the like, with slight warming. The solution is cooled and to it is added a mixture of ice and water so as to attain a temperature between 0° C. and 5° C. To the cooled reaction mixture a molecular proportion of an aqueous solution of an aliphatic or aromatic ester of 1,8-aminonaphthol-3,6-disulfonic acid made neutral with any alkali metal salt is added. The addition is carried out slowly over a period of about 15 minutes and the reaction mixture maintained slightly acid by the addition of an alkali.

In case cyanuric chloride is used as such, an azo dye may be formed from the primary condensation product by the addition of a slurry of a primary aromatic amino bridged by an azo linkage, such as, for example:

5-p-aminophenylazosalicylic acid
4'-dimethylamino-4-aminoazobenzene
1-phenylazo-4-naphthylamine
1-[p-aminophenylazo]-2-naphthylamine-5-sulfonic acid
p-Aminophenylazo-acetoacetanilide
4-[p-aminophenylazo]-1-phenyl-3-methyl-5-pyrazolone
4-[4-amino-3-carboxyphenylazo]-3-methyl-5-pyrazolone
4 - [4 - amino - 2 - methoxyphenylazo] - N,N - di($\beta$ - hydroxyethyl)aniline The cyanuric chloride derivative, in which one of the chlorine atoms in the 2-, 4-, or 6-position, all of which are equivalent to each other, is replaced by an alkylamino, arylamino, heterocyclic amino, or amino compound bridged by an azo linkage, is readily prepared by condensing a one-third molecular proportion of any alkyl, aryl, or heterocyclic primary amino compound or any primary amino azo compound of the type exemplified above. It is to be clearly understood that any primary aliphatic, aromatic, or heterocyclic amine capable of undergoing the diazotization reaction may be employed in the condensation with the cyanuric chloride.

As examples of such primary amino compounds, the following are merely illustrative:

Methylamine
Ethylamine
Ethanolamine
Isopropylamine
n-Butylamine
Dodecylamine
Aniline
p-Chloroaniline
2,5-dichloroaniline
p-Hydroxyaniline
α-Naphthylamine
p-Nitroaniline
o-Nitroaniline
3-nitro-4-toluidine
2-nitro-4-chloroaniline
2,4-dinitroaniline
Sulfanilic acid
1-amino-2-naphthol sulfonic acid
p-Aminodiphenylamine
Benzidine
4,4'-diaminostilbene
1-naphthylamine-6-sulfonic acid
1-(phenyl-4'-sulfo)-3-methyl-4-amino-5-pyrazolone
α-Naphthylamine
Aniline-2,5-disulfonic acid
1-naphthylamine-7-sulfonic acid
2-chloro-4-aminobenzoic acid
Benzidine-2,2'-disulfonic acid
2-amino-4-sulfobenzoic acid
Primuline
2,6-diaminotoluene-4-sulfonic acid
3-aminobenzoic acid
2-amino-8-naphthol-3,6-disulfonic acid
1,4-diaminonaphthalene-3-sulfonic acid
Dianisidine
Tolidine
p-Aminobenzyldiethylamine
p-Acetaminoaniline
Anthranilic acid
2-ethoxybenzidine
o,o'-Diaminodiphenic acid
2,2'-diaminocarbazol
3,3'-dichlorobenzidine
2-nitrobenzidine
4,4'-diaminostilbene-2,2'-disulfonic acid
4,4' diamino-2,2'-tetramethyltriphenylmethane
2-aminobenzothiazole
2-amino-6-ethoxybenzothiazole
2-aminobenzoxazole
4-amino-5-pyrazolone
1-phenyl-3-anilino-4-amino-5-pyrazolone
1-phenyl-3-amino-5-pyrazolone
4,4'-diaminodiphenylurea-3,3'-disulfonic acid
4,4'-diaminodiphenylmethane
2-(4'-phenylamino)-6-methylbenzothiazole
4-aminoperimidine-5,8-disulfonic acid
2-aminopyridine
3-aminopyridine
4-aminopyridine
3-amino-6-alkoxypyridine
2,6-aminopicoline
3-amino-2,5-diphenylpyrrole
3-amino-2,4,5-triphenylpyrrole
3-aminopyrazole
4-aminopyrazole
4-amino-3,5-dimethylpyrazole
5-chloro-4-amino-1-phenyl-3-methylpyrazole
5-amino-1-phenyl-3-methyl-4-alkylpyrazole
4-amino-5-methylanilino-1-phenyl-3-methylpyrazole
5-amino-1,2,4-triazole
5-amino-3-methyl-1,2,4-triazole
5-amino-1,2,3,4-tetrazole
5-aminoisooxazole
3-amino-2-phenyl-1-methylindole
3-amino-2-phenyl-1-ethyl-4,5-benzindole
3-aminoindazole
4-aminoquinoline
5-aminoacridine The remaining chlorine atoms in the cyanuric nucleus of the secondary condensation product are readily replaced by a primary aromatic or heterocyclic amino group by treatment with any one of the foregoing primary amino compounds.

As examples of suitable alkyl, aryl, and aralkyl esters of 1,8-aminonaphthol-3,6-disulfonic acids, which are condensed with the cyanuric chloride or 4-substituted cyanuric chloride, the following may be mentioned:

Methyl sulfonyl ester of 1,8-aminonaphthol-3,6-disulfonic acid
Propyl sulfonyl ester of 1,8-aminonaphthol-3,6-disulfonic acid
Butyl sulfonyl ester of 1,8-aminonaphthol-3,6-disulfonic acid
Octyl sulfonyl ester of 1,8-aminonaphthol-3,6-disulfonic acid
Decyl sulfonyl ester of 1,8-aminonaphthol-3,6-disulfonic acid
Benzene sulfonyl ester of 1,8-aminonaphthol-3,6-disulfonic acid
Naphthalene sulfonyl ester of 1,8-aminonaphthol-3,6-disulfonic acid
Naphthyl sulfonyl ester of 1,8-aminonaphthol-3,6-disulfonic acid
Benzyl sulfonyl ester of 1,8-aminonaphthol-3,6-disulfonic acid
Tolyl sulfonyl ester of 1,8-aminonaphthol-3,6-disulfonic acid
4-acetamido benzene sulfonyl ester of 1,8-aminonaphthol-3,6-disulfonic acid
1,3-xylyl sulfonyl ester of 1,8-aminonaphthol-3,6-disulfonic acid The above compounds are well known in the literature and their methods of preparation need not be described herein.

The following examples will describe the preparation of the 8-[2-chloro-4-substituted-sym-triazinyl-6-amino]-1-substituted sulfonyloxy-3,6-naphthalene disulfonic acids. All the parts given are by weight.

*Example I*

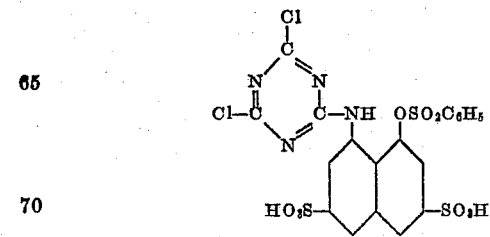

37 parts of cyanuric chloride were dissolved in 150 parts of acetone with little warming. To the mixture were added 200 parts of ice and water and the temperature maintained between 0° and 5° C. To the ice mixture there were added 600 parts of a neutral aqueous solution of 91.8 parts of benzene sulfonyl ester of H-acid. The addition was carried out for a period of 15 minutes and the reaction mixture maintained slightly acid by the addition of 60 parts of aqueous 20% solution of sodium carbonate. The primary condensation product thus formed corresponds to the foregoing formula. The primary condensation product may be isolated as such by the addition of salt to the reaction mixture followed by separation, washing with water, and drying.

The isolated product may be subjected to a secondary condensation reaction if desired by treatment with any primary aliphatic, aromatic, or heterocyclic amine or amino azo compound. To replace the chlorine atom in the 4-position of the cyanuric nucleus of the above product, 51.0 parts of 5-p-aminophenylazo-salicylic acid were added in the form of a slurry to the product. The temperature was raised to 40–50° C. and the mixture maintained barely acid during the course of 1 to 2 hours by the addition of 60 parts of an aqueous 20% solution of sodium carbonate. The resulting secondary condensation product which corresponds to the formula:

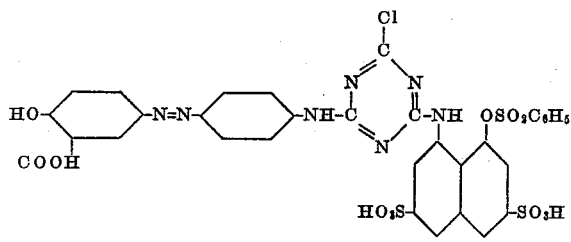

may be isolated by the addition of common salt or the tertiary condensation product may be formed by the addition of 30 parts of aniline, maintaining the pH at 8 to 8.5 with sodium carbonate and heating at 90–100° C. for 2 to 3 hours. The tertiary condensation product thus formed may be isolated by addition of common salt and corresponds to the formula:

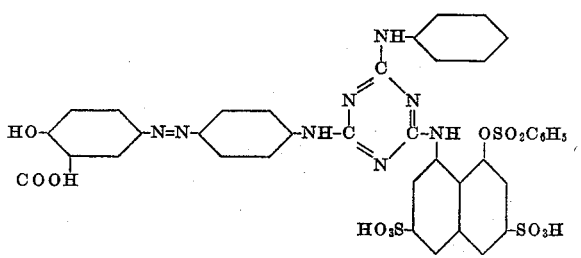

The above tertiary condensation product may be hydrolyzed by addition of 1000 parts of caustic soda solution of 7.2% strength and heating the mixture at 70° C. for 1 to 1½ hours during which time complete solution occurs. The pH is reduced to nearly neutral by addition of mineral acid and the hydrolysis product with corresponds to the formula:

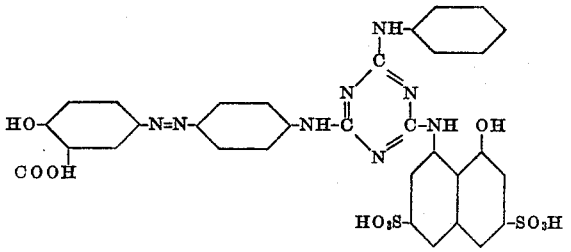

is isolated by the addition of common salt.

*Example II*

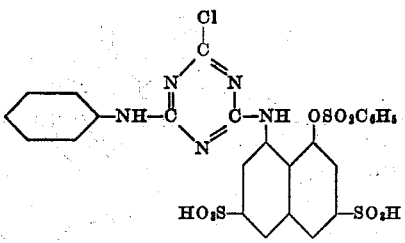

Example I was repeated with the exception that 51 parts of 5-p-aminophenylazo-salicylic acid were replaced by 18.6 parts of aniline.

*Example III*

Example I was repeated with the exception that the condensation of cyanuric chloride with 5-p-aminophenyl-azo-salicylic acid was carried out first followed by the condensation of the product with 91.8 parts of benzene sulfonyl ester of H-acid.

*Example IV*

Example I was again repeated with the exception that 91.8 parts of benzene sulfonyl H-acid were replaced by 85 parts of methane sulfonyl ester of H-acid.

*Example V*

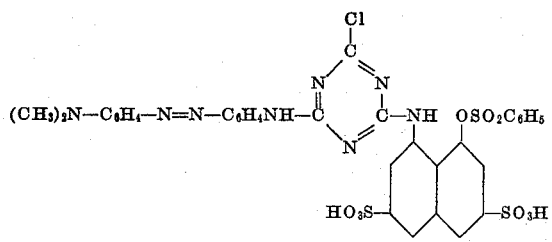

Example I was repeated with the exception that 51 parts of 5-p-aminophenylazo-salicylic acid were replaced by 48 parts of 4'-dimethylaminophenylazo aniline.

*Example VI*

The procedure of Example V was followed with the exception that the condensation of cyanuric chloride with 4'-dimethylaminophenylazo aniline was carried out first, followed by condensation of the product with the benzene sulfonyl ester of 1,8-aminonaphthol-3,6-disulfonic acid.

While there have been pointed out above certain embodiments of the invention, the same is not limited to the foregoing examples, illustrations or to the specific details given therein but is capable of variations and modifications as to the reactants, proportions, and conditions employed.

We claim:
1. A dyestuff intermediate characterized by the following general formula:

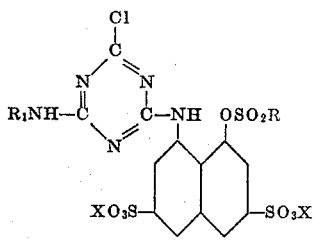

wherein R represents a member selected from the class consisting of alkyl, aryl, and aralkyl radicals, $R_1$ represents an azo bridged radical wherein the azo linkage is para to the attached NH group, and X represents a member selected from the class consisting of hydrogen, an alkali metal ion, ammonium and alkyl, and cycloalkyl ammonium ions.

2. A dyestuff intermediate having the following formula:
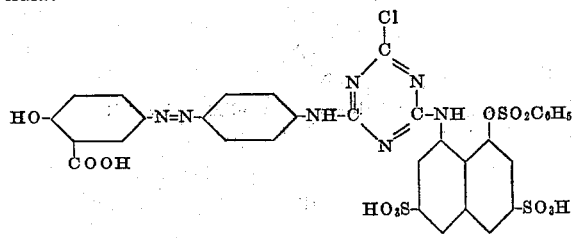
3. A dyestuff intermediate having the following formula:
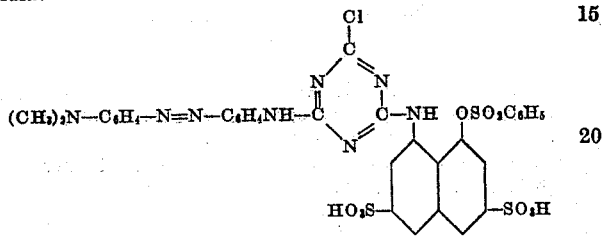
References Cited in the file of this patent
UNITED STATES PATENTS
| | | |
|---|---|---|
| 1,625,530 | Fritzsche et al. | Apr. 19, 1927 |
| 1,958,327 | Winkler | May 8, 1934 |
FOREIGN PATENTS
| | | |
|---|---|---|
| 209,723 | Great Britain | Mar. 23, 1925 |